United States Patent [19]

Lee

[11] Patent Number: 4,774,784
[45] Date of Patent: Oct. 4, 1988

[54] SPRING LOADED FISHING TACKLE

[76] Inventor: Jong J. Lee, 4377 Los Angeles Avenue, Somis, Calif. 93021

[21] Appl. No.: 16,264

[22] Filed: Feb. 19, 1987

[51] Int. Cl.⁴ .............................................. A01K 83/02
[52] U.S. Cl. ....................................................... 43/36
[58] Field of Search ..................................... 43/36, 34

[56] References Cited

U.S. PATENT DOCUMENTS

| | | | |
|---|---|---|---|
| 814,624 | 3/1906 | Robinson | 43/36 |
| 914,906 | 3/1909 | Willis | 43/36 |
| 3,803,748 | 4/1974 | Neal | 43/36 |
| 3,975,856 | 8/1976 | Gadbois | 43/36 |
| 4,104,820 | 8/1978 | Bardebes | 43/36 |
| 4,616,439 | 10/1986 | Lee | 43/36 |

Primary Examiner—Gene P. Crosby
Attorney, Agent, or Firm—Frank Frisenda, Jr.

[57] ABSTRACT

The present discovery provides an improved spring loaded fishing hook. In one embodied form, the hook comprises two hook arms which have a shaft portion, a barbed portion and a bend portion. The hook arms are rotatably attached to one another at the end of the shaft away from the barbed portion of the hook arms. A coiled spring is provided with arms, one of which is rotatably attached to each hook in such a way to allow the force of the spring spread the hooks apart when the spring is activated. One of the hook arms has a pivot located above the bend portion of the hook arm which pivotably connects the barbed portion and the bend portion to the shaft portion of the hook arm. The bend portion of each hook arm is located equally distant from the top of the shaft of the hook arm so that when the hook arms are in the activated position the bend portions are in alignment.

5 Claims, 2 Drawing Sheets

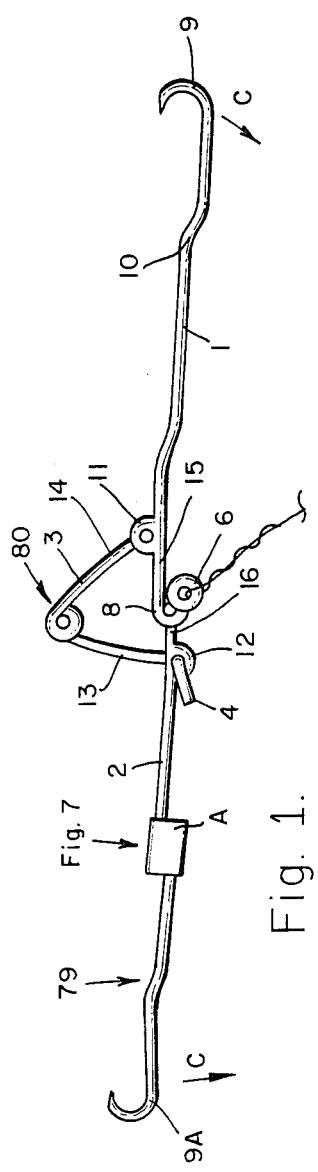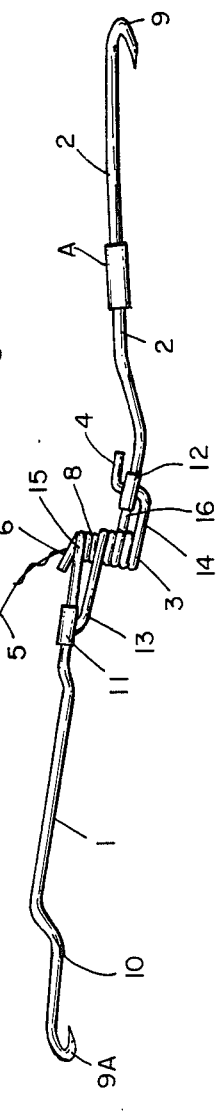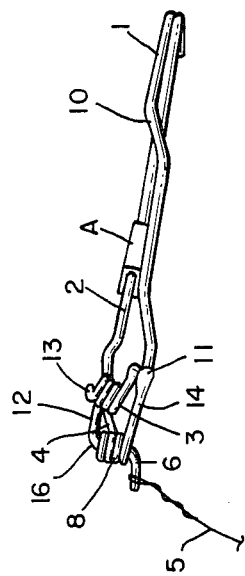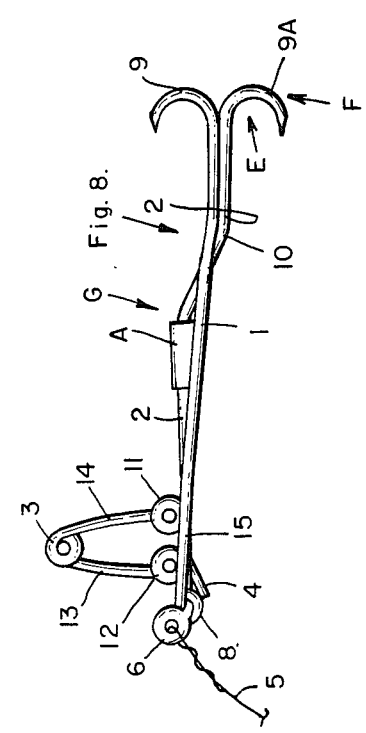

SPRING LOADED FISHING TACKLE

BACKGROUND OF THE INVENTION

1. Field of the Invention

The present invention relates to an improved fishing tackle and particularly to a spring loaded dual action fishing hook. In one embodied form, the inventive tackle comprises two opposed hooks which spring forcibly open up when the hooks are activated by the action of the fish taking the bait.

2. Prior Art

Typically fishermen use single hooks for catching fish. Such hooks have been recognized to be unsatisfactory in that often the fish can remove the bait from the hook without the hook becoming imbedded in the mouth of the fish. Consequently, the art has sought other types of fishing hooks which more effectively hook the fish after the fish has taken bait.

Spring loaded double hook fishing hooks are known in the art. For example, U.S. Pat. No. 3,803,748 discloses a spring loaded double acting fishing hook which is activated when struck by the fish.

Another example of a spring loaded fishing hook is found in U.S. Pat. No. 4,104,820 which provides a fish hook with two arms, each having one end adapted to receive laterally extending spikes to receive bait. The arms are biased towards each other to a position in which the spike ends are in close disposition to each other. When a force is applied to the biased spike ends of the arms, the spiked ends of the arms move apart.

U.S Pat. No. 4,616,439 is another example of a spring loaded fishing hook. In that patent two hooks are movably secured together to move in a scissors like fashion. A spring portion is provided to forcibly separate the point and barb parts of the two hooks. Such mechanism includes a trigger safety. The trigger safety is in the form of a water soluble tablet which dissolves when contacted with the water and hence makes the spring loaded hooks ready to be triggered by the action of the fish.

The prior art devices have not provided a fully satisfactory spring loaded fishing hook. Thus, there is still a need in the art for a better spring loaded double action fishhook which is not activated until the hook is taken by the fish.

SUMMARY OF THE INVENTION

The present invention provides an improved spring loaded fishing tackle which is not easily activated unless the hook is actually taken by the fish.

In one embodied form, the inventive tackle comprises two hook arms which have a shaft portion, a barbed portion and a bend portion. The hook arms are rotatably attached to one another at the end of the shaft away from the barbed portion of the hook arms. A coiled spring is provided with arms, one of which is rotatably attached to each hook in such a way to allow the force of the spring spread the hooks apart when the spring is activated. One of the hook arms has a pivot located above the bend portion of the hook arm which pivotably connects the barbed portion and the bend portion to the shaft portion of the hook arm. The bend portion of each hook arm is located substantially the same distance from the top of the shaft of the hook arm so that when the hook arms are in the activated position the bend portions are in alignment.

In operation, the hooks are loaded for use by bringing the two hook arms together until the bends of the hook arms are in contact with one another.

In this loaded position, the device is ready to be activated by any force applied to the barbed portion of the hook arm having the pivot, either in the generally sideward direction or in an upward direction which would normally be supplied from the striking action on the hook by a fish. The bend of the hook arm without the pivot acts as a fulcrum upon which the shaft of the hook arm containing the pivot, rotates with its bend portion as the center of the rotating movement. Hence the spring flies open and imbeds the barbs in the mouth of the fish.

BRIEF DESCRIPTION OF THE DRAWINGS

FIG. 1 is a side view of the hook in expanded position.

FIG. 2 is a top view of FIG. 1 of the hook in expanded position.

FIG. 3 is a side view of the hook in loaded position.

FIG. 4 is a top view of FIG. 3 of the hook in loaded position.

Figure 5:
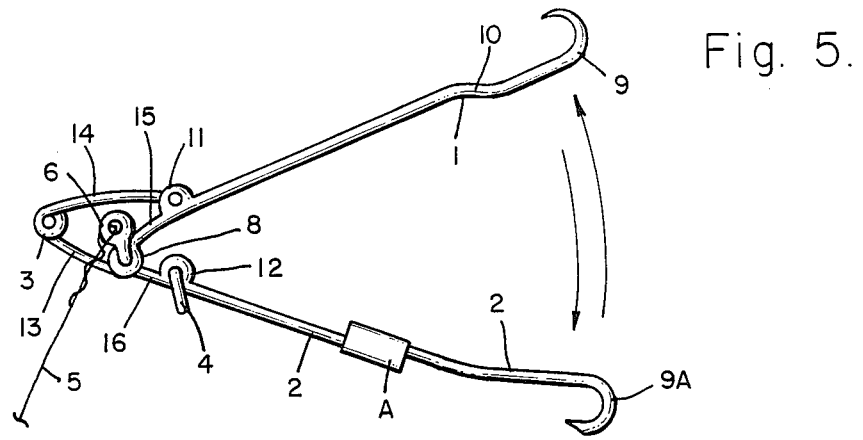
FIG. 5 is a side view of the hook in a semi expanded position.
Figure 6:
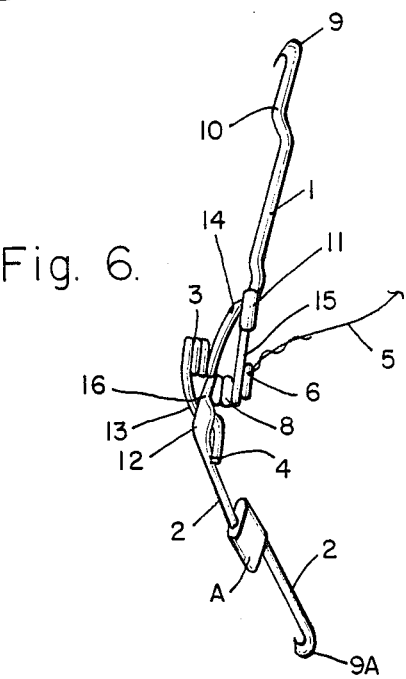
FIG. 6 is a front view of FIG. 5 and is a top view of the hook in a semi expanded position.
Figure 7:
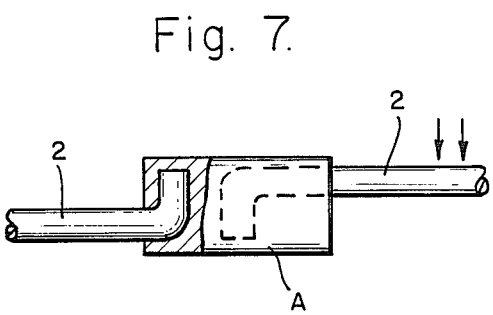
FIG. 7 is a detail view of the pivot included in one of the hook arms.
Figure 8:
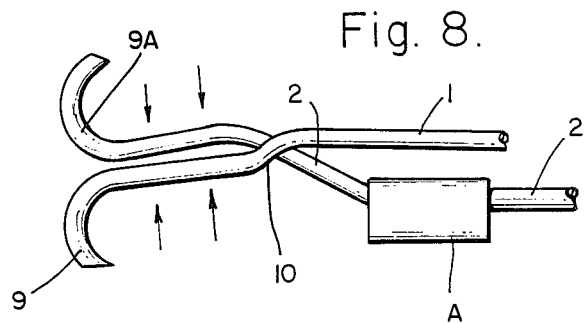
FIG. 8 is a detail view of the hook arms in the loaded position.

According to the invention a spring loaded tackle for fishing or catching small animals is provided. The tackle includes a first hook arm and a second hook arm. The hook arms have a shaft portion, a barbed portion and a bend portion. The bend portion is located between the shaft and barbed portions. The second hook arm is rotatably secured to the first hook arm at the end of each shaft of the hook arms.

A spring having a coiled portion and right and left arm is rotatably connected to the hook arms. The right spring arm and the left spring arm are rotatably connected to the first hook arm and to second hook arm respectively to allow the force of the spring to spread apart the first and second hook arms when the spring is activated.

The bend portion of the first and second hook arms is located at a distance from the top (that is the end distal from the barbs) of the hook arms so that when the hook arms are activated from a loaded position the bend portions overlap.

A pivot means is located above the bend portion of the first hook arm. The pivot is located below the connection of the first hook arm to the second hook arm and below the connection of the hook arms to the spring arms. As used herein the term above refers to the direction distal from the barb and the term below refers to the direction toward the barb. The pivot means rotatably connects the bend and barbed portion of the first hook arm to the shaft. Thus, the bend of the second hook arm acts as a fulcrum for the shaft of the first hook arm to pivot, with the bend of the first hook arm being the center of the pivot movement when a force is applied to the hook arm by a fish striking it and thus activating the spring to spread the hook arms apart.

DESCRIPTION OF THE PREFERRED EMBODIMENT

Referring to FIG. 1, the hook is composed of 3 main components. The spring 3 and the two hook arms 1,2. The spring 3 comprises of a coiled part 80 and two arms 13, 14. The hook arm 1 comprises of a shaft portion 15, a bend portion 10 and a barbed portion 9. Hook arm 2 comprises a shaft portion 16, a joint portion A, a bend portion 79, and a barbed portion 9A.

The hook arms 1,2 are movably secured to each other at the ends of the shafts 15,16 by portion 8. The arms 14 and 13 of spring 3 are movably secured to the hook arms 1,2 at the points 11,12 respectively.

To load the hook, the two hook arms 1,2 are brought together in the direction of the arrows c of FIG. 1 until the bend 79 of the hook arm 2 is in contact with bend 10 of hook arm 1.

At this loaded position (referring to FIG. 3) the hook is ready to be activated by any force applied to barbed portion 9A of hook arm 2 in the general direction of arrow E or F which will cause the joint A of hook arm 2 to move in the direction of arrow G. The bend 10 of hook arm 1 acts as a fulcrum on which the shaft 16 (part that is distal to the joint A) of hook arm 2 pivots with the bend portion 79 as the center of the pivot movement.

As can be seen on FIG. 3 the proximal parts of the shafts 15,16 are not parallel to each other. When said force is applied to barbed portion 9A of hook arm 2, it causes the proximal (to the joint part A) part of hook arm 2 to be in parallel position in relation to hook arm 1. In this position the force of the loaded spring is no longer in check by the internal configuration of the hook and therefor the two hook arms 1,2 are forcibly spread apart by the force of the spring 23.

It should be understood that the improved spring loaded tackle in accordance with the invention can also be utilized to catch small animals, for instance rodents.

The preferred material for fabrication of the hook arm is stainless steel. The preferred material for fabricating the bend portion of the spring loaded tackle is either brass or copper.

It is an important feature of the invention that the spring force exerted by the spring should be in an amount sufficient to open the hook arms when a fish strikes either arm, thus activating the spring to spread the hook arms apart and snag the fish.

To remove the device once imbedded in the mouth of the fish, the coiled portion of the spring is pushed toward the open mouth of the snagged fish. The attached fishing line in the area of the component generally denoted 6 can then be pulled away from the fish's mouth to free the device from the fish's mouth.

It should be understood by those skilled in the art that various modifications may be made in the present invention without departing from the spirit and scope of thereof as described in the specification and defined in the appended claims.

I claim:

1. An improved spring loaded tackle comprising:
   a first hook arm;
   a second hook arm; said hook arms having a shaft portion, barbed portion and a bend portion; said bend portion located between said shaft and barbed portions;
   said second hook arm rotatably secured to said first hook arm at the end of each shaft of said hook arms;
   said hook arms having a top at the end distal from said barbed portion;
   a spring having a coiled portion and right and left arms;
   said right spring arm and said left spring arm rotatably connected to said first hook arm and to said second hook arm respectively to allow the force of the spring to spread apart said first and second hook arms when the spring is activated from a loaded position;
   said bend portion of said first and second hook arms located at a distance from the top of said hook arms that when the hook arms are loaded the bend portions overlap;
   a pivot means located above the bend portion of said second hook arm and located below the connection of said first hook arm to said second hook arm and below the connection of the hook arms to said spring arms; said pivot means rotatably connecting said bend and barbed portion of said second hook arm to said shaft; whereby said bend of said first hook arm acts as a fulcrum for the shaft of said second hook arm to pivot, with the bend of the second hook arm being the center of the pivot movement when a force is applied to the hook arm by an animal striking it and thus activating the spring to spread the hook arms apart.

2. The improved spring loaded tackle as defined in claim 1 wherein said first hook arm and said second hook arm are fabricated from stainless steel.

3. The improved spring loaded tackle as defined in claim 1 wherein said bend portion is fabricated from brass.

4. The improved spring loaded tackle as defined in claim 1 wherein said bend portion is fabricated from copper.

5. The improved spring loaded tackle as defined in claim 1, said spring having a spring force in an amount sufficient to open said first and second hook arms when a force is applied to a hook arm by a fish striking it.

* * * * *